US008448968B1

(12) United States Patent
Grote et al.

(10) Patent No.: US 8,448,968 B1
(45) Date of Patent: May 28, 2013

(54) ADAPTABLE VEHICLE STEP ASSEMBLY (75) Inventors: Gregory John Grote, Brandon, SD (US); Berndard Dale Stoltenberg, Brandon, SD (US); John Martin Schulzetenberg, Sioux Falls, SD (US)

(73) Assignee: Luverne Truck Equipment, Inc., Brandon, SD (US)

( * ) Notice: Subject to any disclaimer, the term of this patent is extended or adjusted under 35 U.S.C. 154(b) by 0 days.

(21) Appl. No.: 13/423,899

(22) Filed: Mar. 19, 2012

(51) Int. Cl.
*B60R 3/00* (2006.01)

(52) U.S. Cl.
CPC .. *B60R 3/002* (2013.01); *B60R 3/00* (2013.01)
USPC .......................................... 280/163; 280/169

(58) Field of Classification Search
CPC ................... B60R 3/002; B60R 3/00
USPC ................. 280/163, 169, 166, 164.1, 164.2; 296/1.07, 151, 203.1, 209; 152/215; 248/231.71, 674
See application file for complete search history.

(56) References Cited

U.S. PATENT DOCUMENTS

| | | | | |
|---|---|---|---|---|
| 5,403,032 A * | 4/1995 | Hellwig | ................ | 280/124.163 |
| 5,895,064 A * | 4/1999 | Laubach | ................... | 280/163 |
| 6,533,302 B2 * | 3/2003 | Scruggs et al. | ................ | 280/163 |
| 7,360,779 B2 * | 4/2008 | Crandall | ................ | 280/163 |
| 8,016,309 B2 * | 9/2011 | Flajnik et al. | ................ | 280/169 |
| 8,152,187 B1 * | 4/2012 | Crandall | ................ | 280/163 |
| 2003/0011163 A1 * | 1/2003 | Coomber et al. | ................ | 280/163 |
| 2006/0114685 A1 * | 6/2006 | Seeber | ................ | 362/495 |
| 2007/0126201 A1 * | 6/2007 | Crandall | ................ | 280/163 |
| 2008/0246244 A1 * | 10/2008 | Watson | ................ | 280/166 |
| 2009/0044729 A1 * | 2/2009 | Navarre et al. | ................ | 108/44 |
| 2011/0079981 A1 * | 4/2011 | McFarlane | ................ | 280/163 |
| 2012/0104718 A1 * | 5/2012 | Alvarez et al. | ................ | 280/163 |

* cited by examiner

*Primary Examiner* — John Walters
*Assistant Examiner* — James Triggs
(74) *Attorney, Agent, or Firm* — Jeffrey A. Proehl; Woods, Fuller, Shultz & Smith, P.C.

(57) ABSTRACT

A vehicle step assembly for mounting on a vehicle adjacent to the body of the vehicle may include an elongated step having opposite ends and a hollow space formed in the step and extending between the ends, and at least one support bracket with a mounting portion configured to mount on the vehicle and a support portion configured to support the elongated step, with the support portion having a support surface on which the elongated step rests. The assembly may also include at least one clamp mounting the step on the at least one support bracket, with the at least one clamp being configured to engage the step at substantially any location along the length of the step between the opposite ends.

23 Claims, 6 Drawing Sheets

ADAPTABLE VEHICLE STEP ASSEMBLY

BACKGROUND

1. Field

The present disclosure relates to vehicle steps and running boards and more particularly pertains to a new adaptable vehicle step assembly for use on a variety of different vehicle applications without requiring customization for the design of each vehicle.

2. Description of the Prior Art

Accessories for vehicles often require customization, or a specific design, for each different make and model of vehicle on which the accessory is intended to be used. Vehicle designs have very little degree of standardization, and this is particularly true for the body and chassis of vehicles, which can vary greatly from one vehicle to another. This non-uniformity can make it difficult if not impossible to create accessories that can be used on a wide variety of vehicles, and tends to require that each different vehicle application requires a different variation of the otherwise similar accessory. This variation can limit the number of makes and models of vehicles for which a vendor can offer accessories due to the typical high cost of designing, producing, and maintaining an inventory of different designs for a particular accessory. These factors can serve to limit the number of vehicles applications a vendor of accessories is able to offer.

SUMMARY

In view of the foregoing, the present disclosure describes a new adaptable vehicle step assembly which may be utilized for use on a variety of different vehicle applications without requiring customization for the design of each vehicle.

In one aspect, the disclosure relates to a vehicle step assembly for mounting on a vehicle adjacent to the body of the vehicle. The assembly may comprise an elongated step having opposite ends and a hollow space formed in the step and extending between the ends. The assembly may also comprise at least one support bracket with a mounting portion configured to mount on the vehicle and a support portion configured to support the elongated step, with the support portion having a support surface on which the elongated step rests. The assembly may further comprise at least one clamp mounting the step on the at least one support bracket, with the at least one clamp being configured to engage the step at substantially any location along the length of the step between the opposite ends.

In another aspect, the disclosure relates to a vehicle step assembly for mounting on a vehicle adjacent to the body of the vehicle. The assembly may comprise an elongated step having opposite ends and a hollow space formed in the step and extending between the ends, with the step including a channel between the hollow space and an exterior of the step. The assembly may also comprise at least one support bracket with a mounting portion configured to mount on the vehicle and a support portion configured to support the elongated step, with the support portion having a support surface on which the elongated step rests. The assembly may further comprise at least one clamp mounting the step on the at least one support bracket, with the at least one clamp being configured to engage the step at substantially any location along the length of the step between the opposite ends. The at least one clamp may be positioned in the hollow space of the step to simultaneously clamp portions of the elongated step at opposite sides of the channel between the clamp and the support bracket.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
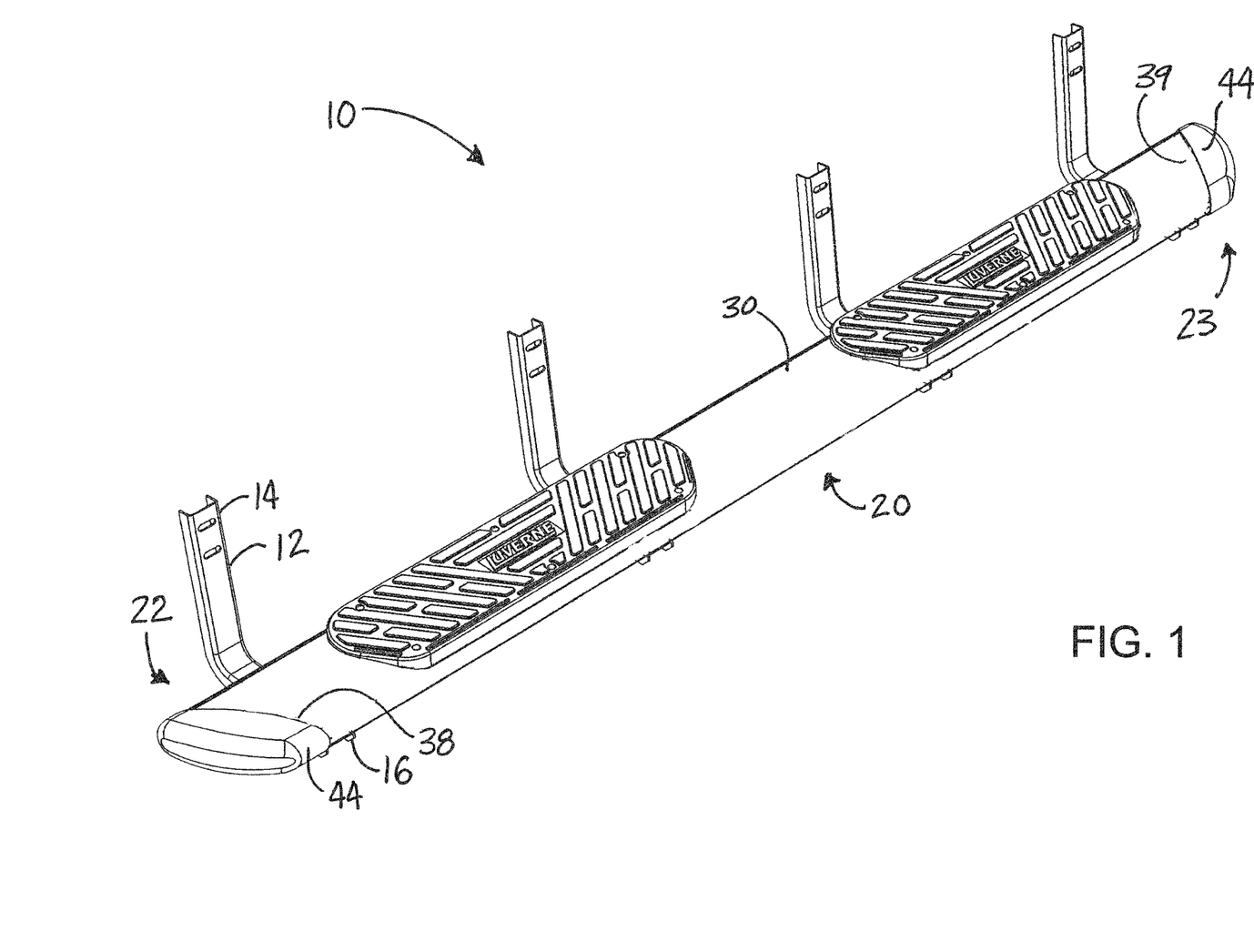
FIG. 1 is a schematic perspective view of a new adaptable vehicle step assembly according to the present disclosure.
Figure 2:
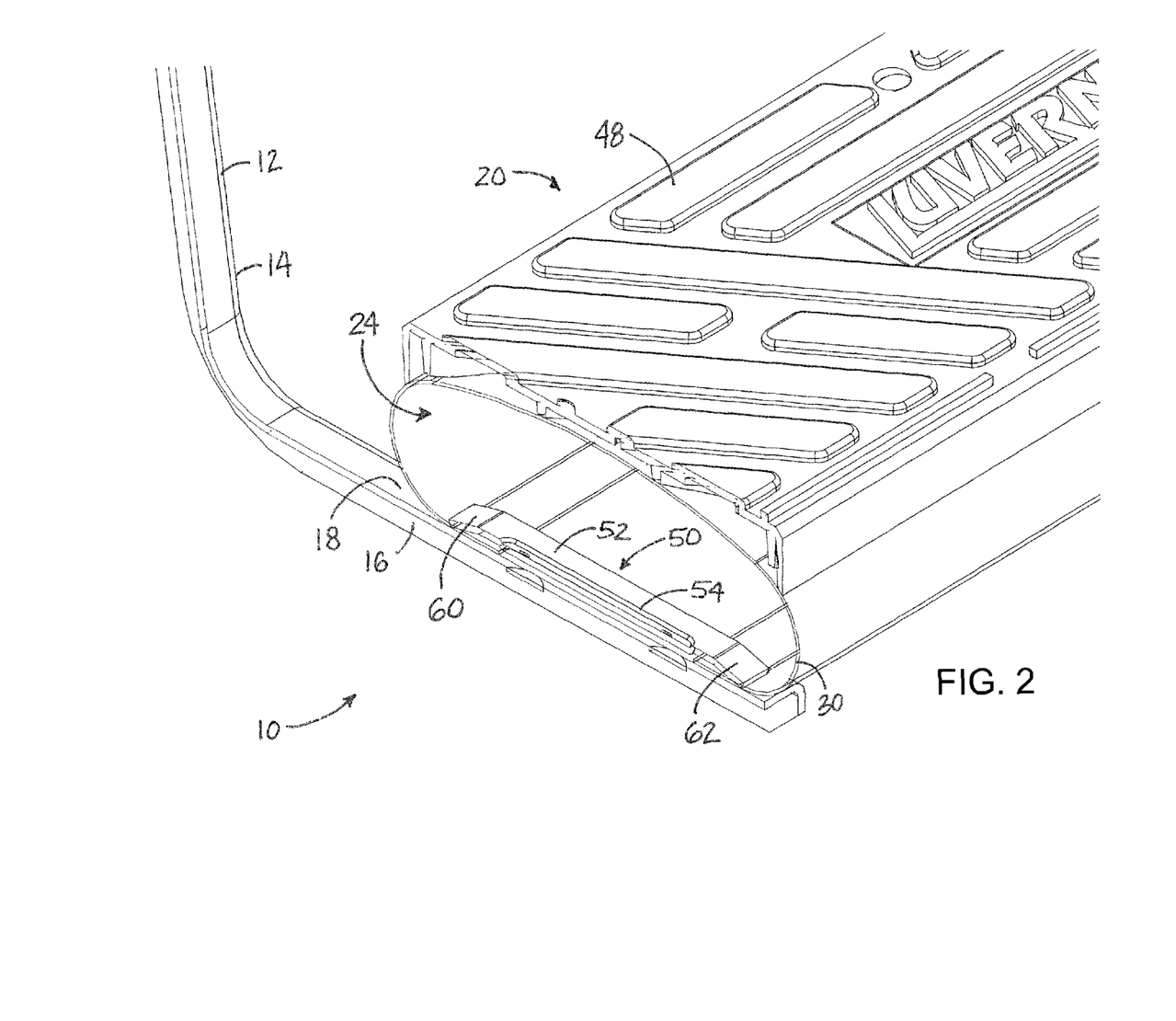
FIG. 2 is a schematic perspective view of a section of the step assembly taken along line 2-2 of FIG. 1, according to an illustrative embodiment.
Figure 3:
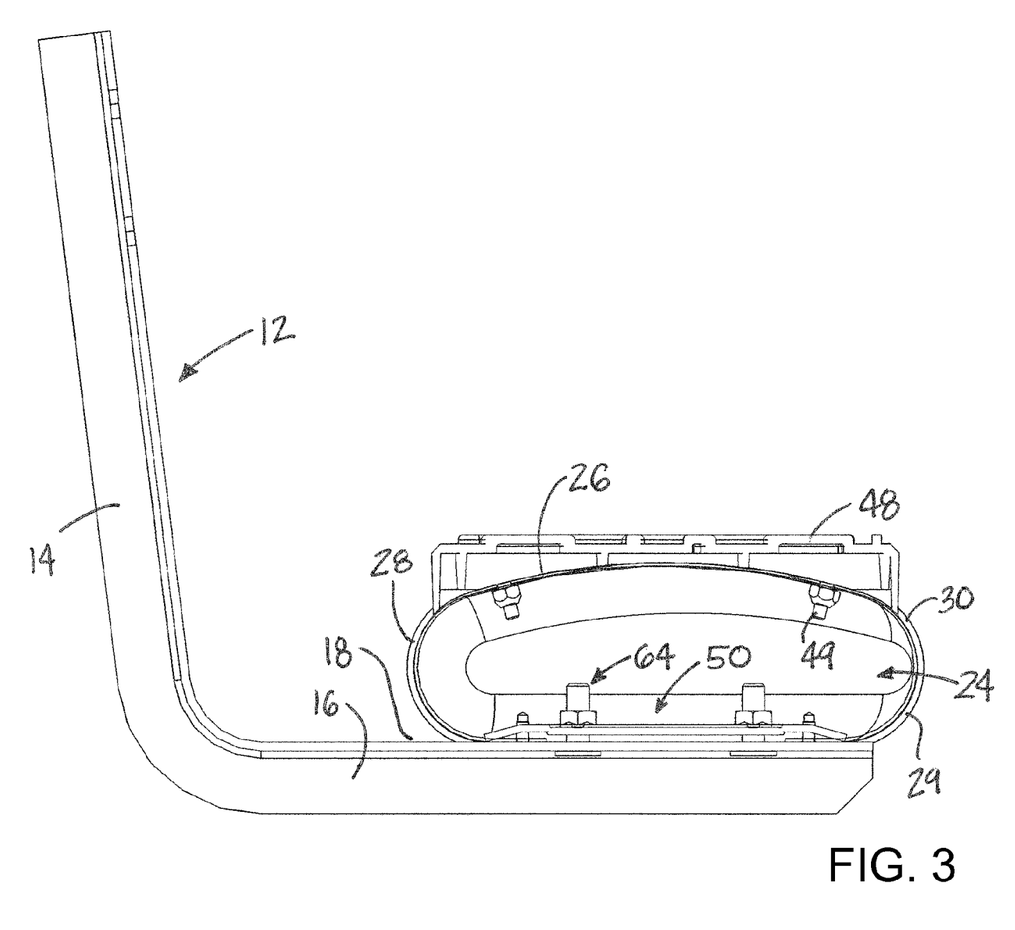
FIG. 3 is a schematic sectional view of the step assembly taken along line 2-2 of FIG. 1, according to an illustrative embodiment.
Figure 4:
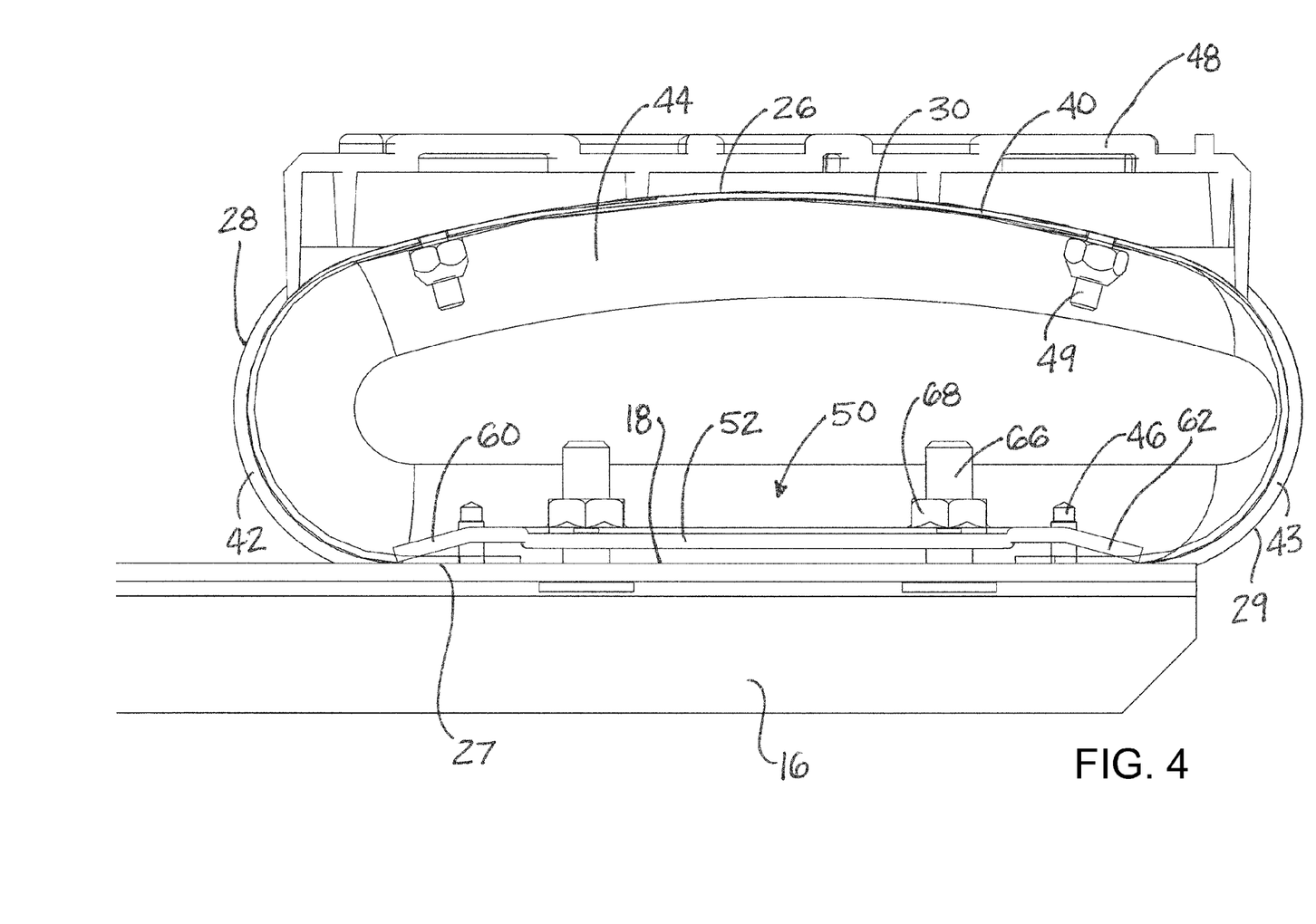
FIG. 4 is an enlarged schematic sectional view of the step assembly along line 2-2 of FIG. 1, according to an illustrative embodiment.
Figure 5:
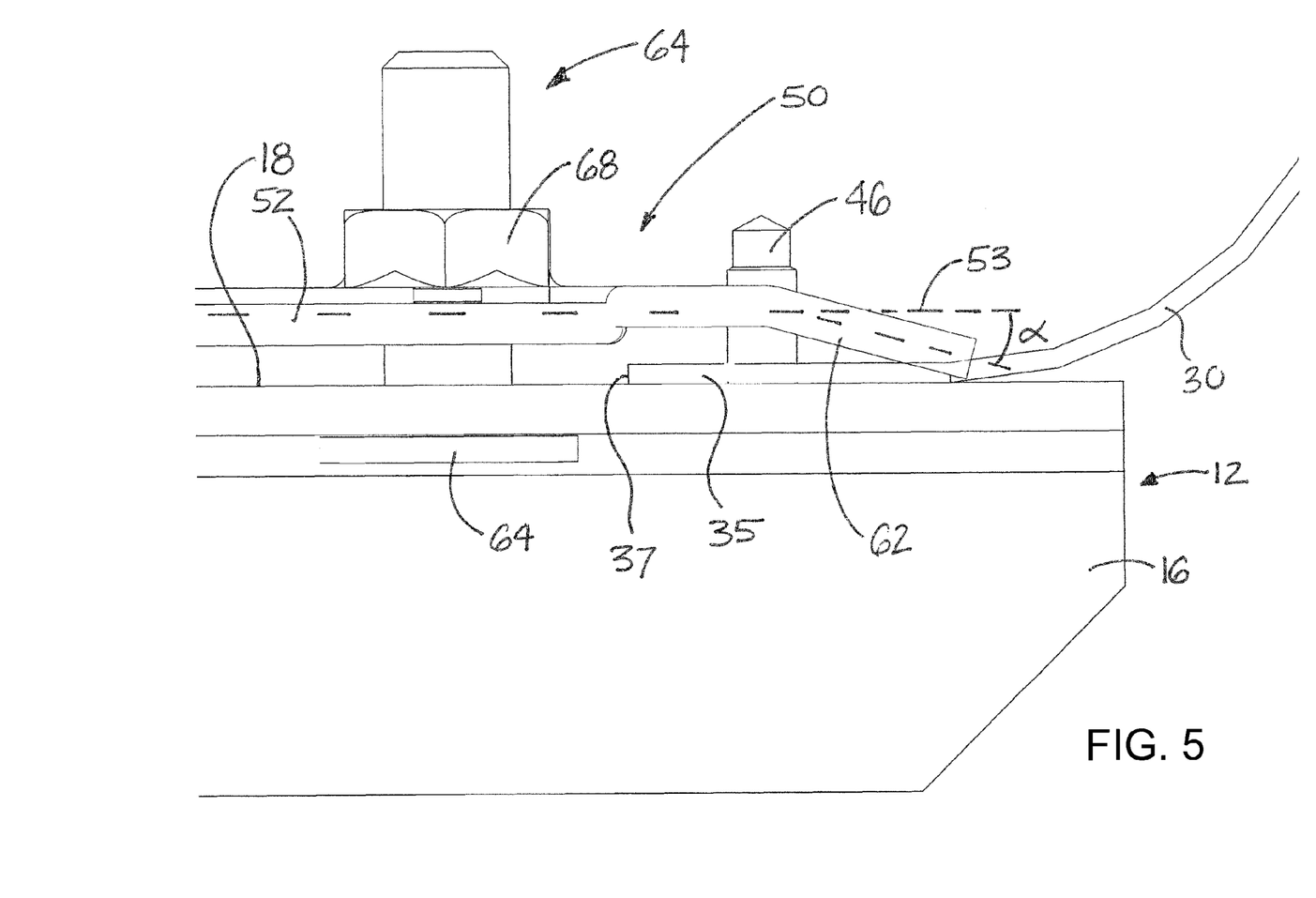
FIG. 5 is a further enlarged schematic sectional view of the step assembly take along line 2-2 of FIG. 1, according to an illustrative embodiment.
Figure 6:
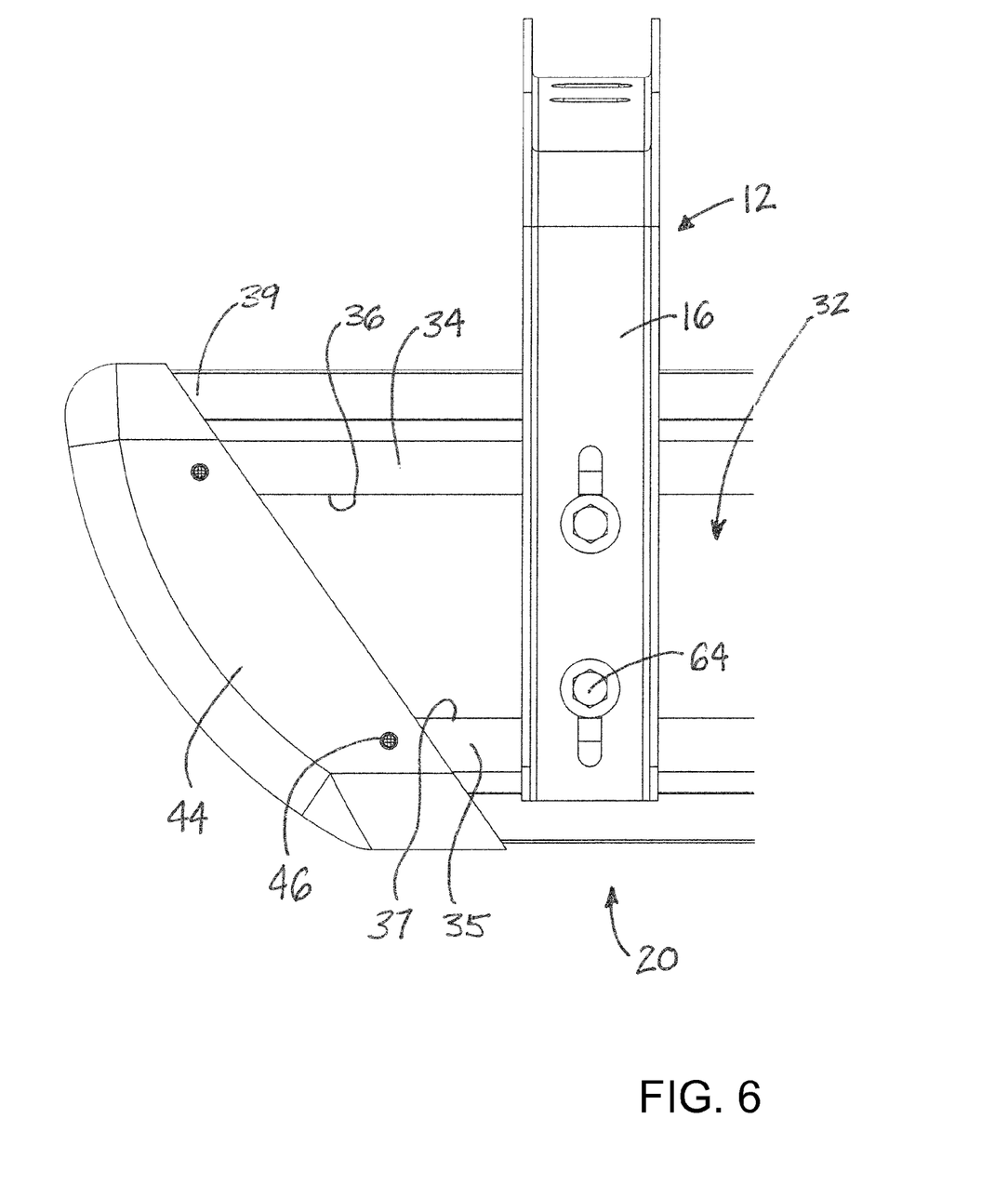
FIG. 6 is a schematic bottom view of an end portion of the step assembly, according to an illustrative embodiment.

With reference now to the drawings, and in particular to FIGS. 1 through 6 thereof, a new adaptable vehicle step assembly embodying the principles and concepts of the disclosed subject matter will be described.

The applicant has recognized that a vehicle step assembly design that includes parts that can be used on as many different vehicle applications as possible, without special modification for those different applications, provides a step assembly that is less costly to manufacture, inventory and sell than vehicle steps that need to be customized to be used on different vehicles. The applicant has further recognized that this advantage can be achieved to a significant extent by the disclosure in which the vehicle mounting brackets are customized to fit a particular make and model of vehicle, and a step that is uniformly mountable on each of the different mounting brackets. The number of mounting brackets, and the spacing between the brackets, for different vehicles will vary, and the disclosure provides a step that accommodates the different spacings without requiring customization of the step such as the use of special adapters and the formation of special holes in the step.

In one aspect of the disclosure, a vehicle step assembly 10 is disclosed that is suitable for mounting on a vehicle, and is highly suitable for providing a step positioned adjacent to, but separate or spaced from, the body of the vehicle. In some embodiments, the step assembly is configured to be mounted on a vehicle such as a pickup truck, although the usefulness of the assembly 10 is not limited to such vehicles.

The vehicle step assembly 10 may include at least one support bracket 12 for mounting on a vehicle, and typically includes at least two and often more brackets for each step assembly on each side of the vehicle. The configuration of the support brackets 12, and the number of brackets employed, is typically adapted for the structure of the particular vehicle on which the step assembly is to be mounted. Thus the support brackets utilized will vary from vehicle application to vehicle application. Even with the differing configurations utilized for different vehicles, the brackets generally have some common elements, including a mounting portion 14 configured to mount on the vehicle and a support portion 16 configured to support the elongated step 20. In most mounting brackets, the support portion 16 may be generally horizontally oriented when the support bracket is mounted on the vehicle for use, with a substantially horizontal support surface 18 thereon. The support portion may also have one or more mounting holes formed therein for mounting the step 20. Generally, the mounting portion 14 in many configurations of support brackets 12 may be generally vertically oriented when the support bracket is mounted on the vehicle for use, although this is not critical to the operation of the assembly 10. When multiple support brackets are employed on a side of a vehicle, the plurality of support brackets 12 are positioned in an array adjacent to the vehicle with the support surfaces 18 of the support portions being generally aligned in a common horizontal plane.

The vehicle step assembly 10 may also comprise an elongated step 20 that is supportable on the at least one support bracket 12, and on the support surface 18 of the support portion 16. The step 20 may generally have opposite ends 22, 23 and a hollow space 24 that is formed in the step and extends between the ends 22, 23. The step 20 may have a top 26 for orienting upwardly when the step is mounted, and a bottom 27 for orienting downwardly when the step is mounted. The hollow space 24 generally opens downwardly or in a downward direction through the bottom 27 of the step. The step 20 may have opposite sides 28, 29 that extend generally between the top 26 and bottom 27. In many of the most preferred embodiments, the distance between the opposite sides 28, 29 may be relatively greater than a distance between the top 26 and bottom 27.

The step 20 may comprise an open tube 30 that extends between the ends 22, 23 of the step. The open tube may define a channel 32 between longitudinal edge portions 34, 35 positioned on opposite sides of the channel 32, and between opposite edges 36, 37 on the longitudinal edge portions. The perimeter wall of the tube is thus incomplete and is interrupted by the gap of the channel. The channel 32 may be located on the bottom 27 of the step and open downwardly.

The opposite edges 36, 37 define the width of the channel, and the width of the channel may be less and narrower than the width of the hollow space 24 in the step 20 taken in a transverse cross section of the step. In some of the most preferred embodiments, the open tube may have a substantially oval cross sectional profile in transverse cross section. The channel 32 may extend between ends 38, 39 of the tube, and each of the ends may have an end opening that opens into the channel. The open tube 30 may include an upper portion 40 located toward the top 26 of the step and may include a pair of side portions 42, 43 located at the opposite sides 28, 29 of the step. In some embodiments, the open tube 30 may be formed by a thin sheet of material of substantially uniform thickness and suitable strength, such as a metal including, but not limited to, stainless steel.

The step 20 may also include at least one end cap 44 located at one of the ends 22, 23 of the step, and the end cap may be mounted on the end 38, 39 of the open tube 30. In some embodiments, an end cap is mounted on each end of the tube, and the end caps may have different configurations. A portion of the end cap 44 may be mounted over the end opening of the open tube 30, and may be attached to the open tube by at least one fastener 46 that extends through a portion of the end cap and through a portion of the open tube. Typically, an end cap may be mounted on each of the opposite ends 38, 39 of the tube.

One or more step pads 48 may be mounted on the open tube 30 to provide a surface of enhanced grip. The step pad 48 may be located at the top 26 of the step. In some of the more preferred embodiments, two or three (or more) of the step pads 48 may be mounted on the open tube 30 at spaced locations along the longitudinal axis of the step, and may be positioned to substantially align in a vertical sense with a door opening. The step pad 48 may be attached to the open tube by at least one fastener 49 extending through a portion of the step pad and a portion of the open tube.

The vehicle step assembly 10 may also include at least one clamp 50 mounting the step 20 on one of the support brackets 12. Significantly, the clamp 50 may be configured to mount the step to the support bracket at a virtually unlimited number of locations along the length of the step without any special modification or special structure at the location of mounting so that the clamp may be utilized at any location along the length of the tube 30. The substantially infinite degree of adjustability of the position of the clamp on the step permits the clamp to be easily and freely moved to the corresponding position of the support bracket for the particular vehicle application. The clamp 50 may be positioned at least partially in the hollow space 24 of the step 20 to position, and clamp, portions of the elongated step against the support bracket. Typically portions of the longitudinal edge portions 34, 35 are positioned between the clamp 50 and the support bracket. The clamp 50 may simultaneously engage portions of the tube 30 at opposite sides of the channel 32. The clamp 50 pinches portions of the step against the support bracket 12 at the support surface 18. The clamp 50 may be elongated with a length, and the length may be greater than the width of the channel. One of the clamps 50 may be mounted on each of the support brackets 12 that are mounted on the vehicle.

In greater detail, some embodiments of the clamp 50 may include a central section 52 which may be generally planar in configuration and extend in a first plane 53. The central section 52 may have an aperture 54 that extends therethrough, and may be elongated into a slot. A portion of the central section 52 may be depressed with respect to a remainder portion of the central section to provide strengthening of the central section.

The clamp 50 may further include a pair of opposite end sections 60, 62 for engaging locations of the tube 30 on opposite sides of the channel 32. The opposite end sections 60, 62 may extend in substantially opposite directions from the central section 52, and each of the end sections 60, 62 may be canted with respect to the central section for contacting the edge portions 34, 35 of the open tube without the central section contacting the support bracket 12 when fastened together. More specifically, each of the opposite end sections 60, 62 may be positioned in a plane oriented at an angle $\alpha$ to the first plane 53 of the central portion. The angle $\alpha$ may measure from 0 degrees to approximately 15 degrees, although larger angles may less preferably be employed. The opposite end sections 60, 62 are generally angled in the same direction and generally at the same angle.

The assembly may further include a fastener assembly 64 that is configured to fasten the clamp 50 to the corresponding support bracket 12. The fastener assembly 64 is most suitably of the type that permits the clamp 50, and thus the open tube 30, to be mounted to the support bracket 12 as the support bracket is mounted on the vehicle. The fastener assembly 64 may comprise a bolt 66 and a nut 68, although other types of fasteners may be employed.

In use, a set of support brackets 12 may be selected that are suitable for the particular vehicle application, while the step 20 may be selected simply based upon the length of the step, and not with regard to the particular configuration or positioning of the support brackets when mounted on the vehicle. Once the suitable support brackets are selected and mounted on the vehicle, the step 20 may be rested upon the support portions 16 of the support brackets installed on a side of the vehicle. A clamp 50 may be positioned in the hollow space 24 of the step in a position corresponding to the support bracket, with the clamp being positioned generally above the support portion 16. The end sections of the clamp may be rested upon the edge portions 34, 35 on opposite sides of the channel 32, with the central section being positioned over the channel 32. The fastener assembly may be passed through a hole in the support bracket 12 and the aperture in the central section of the clamp, and the fastener then tightened to press the end sections against the edge portions 34, 35 and the edge portions against the support bracket. Tightening of the fastener assembly 64 increases the pinching effect of the end sections against the edge portions 34, 35 as the central section 52 is pulled toward the support bracket.

Significantly, the support bracket 12 and clamp 50 do not have to be aligned with or connected to any structure or aperture on the tube in order to mount the step. Since bracket spacing will often vary from one vehicle application to the next, the avoidance of structures or apertures for connecting avoids having to have specially adapted steps 20 for each vehicle application. The only vehicle application specific factor is the overall length of the step 20, and two or three or possibly more standard lengths may be used to suit a large number of different vehicles. As a result, while a specific support bracket package may be needed for the particular vehicle application, the step package for a vehicle only differs from other packages by the length of the step.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A vehicle step assembly for mounting on a vehicle adjacent to the body of the vehicle, the assembly comprising:
   an elongated step having opposite ends and a hollow space formed in the step and extending between the ends;
   at least one support bracket with a mounting portion configured to mount on the vehicle and a support portion configured to support the elongated step, the support portion having a support surface on which the elongated step rests; and
   at least one clamp mounting the step on the at least one support bracket, the at least one clamp being configured to engage the step at substantially any location along the length of the step between the opposite ends;
   wherein the at least one clamp is elongated with an indented center such that opposite ends of the clamp engage the step without the center engaging the step.

2. The assembly of claim 1 wherein the at least one clamp is positionable in the hollow space of the step to clamp portions of the elongated step against the support bracket.

3. The assembly of claim 1 wherein the step includes a channel between the hollow space and an exterior of the step, and the clamp is configured to simultaneously engage portions of the step at opposite sides of the channel.

4. The assembly of claim 3 wherein the clamp is configured to pinch the portions of the step between the clamp and the support bracket.

5. The assembly of claim 1 wherein the step includes a channel between the hollow space and an exterior of the step, the channel having a width defined between opposite edges on the step, the clamp being elongated with a length greater than the width of the channel.

6. The assembly of claim 1 wherein one said clamp is associated with each support bracket of a plurality of support brackets.

7. The assembly of claim 1 wherein the step includes a channel between the hollow space and an exterior of the step, the at least one clamp including a central section generally positioned in a first plane and a pair of opposite end sections for engaging locations on the step on opposite sides of the channel, the opposite end sections extending in substantially opposite directions from the central section and each of the end sections being canted with respect to the first plane of the central section for engaging the locations on the opposite sides of the channel.

8. The assembly of claim 1 additionally comprising a fastener assembly configured to fasten the at least one clamp to the at least one support bracket.

9. The assembly of claim 1 wherein the step comprises an open tube extending between the ends of the step, the open tube defining a channel with longitudinal edge portions positioned on opposite sides of the channel for resting on the support bracket.

10. The assembly of claim 9 wherein the channel is located on a bottom of the step and opens downwardly, the channel extending between ends of the tube.

11. The assembly of claim 9 wherein the open tube has a substantially oval cross sectional profile.

12. The assembly of claim 9 wherein the open tube has ends with end openings, and wherein the step includes at least one end cap located at one of the ends of the step.

13. The assembly of claim 9 wherein the step includes at least one step pad mounted on the open tube.

14. A vehicle step assembly for mounting on a vehicle adjacent to the body of the vehicle, the assembly comprising:
- an elongated step having opposite ends and a hollow space formed in the step and extending between the ends, the step including a channel between the hollow space and an exterior of the step;
- at least one support bracket with a mounting portion configured to mount on the vehicle and a support portion configured to support the elongated step, the support portion having a support surface on which the elongated step rests; and
- at least one clamp mounting the step on the at least one support bracket, the at least one clamp being configured to engage the step at substantially any location along the length of the step between the opposite ends, the at least one clamp being positioned in the hollow space of the step and having an indented center section between protruding end sections configured to simultaneously contact and clamp portions of the elongated step at opposite sides of the channel between the clamp and the support bracket.

15. The assembly of claim 14 wherein the channel has a width defined between opposite edges on the step, and the clamp is elongated with a length greater than the width of the channel.

16. The assembly of claim 14 wherein the at least one clamp includes a central section generally positioned in a first plane and a pair of opposite end sections extending in substantially opposite directions from the central section, each of the end sections being canted with respect to the first plane of the central section for engaging the locations on the opposite sides of the channel.

17. The assembly of claim 14 additionally comprising a fastener assembly configured to fasten the at least one clamp to the at least one support bracket.

18. The assembly of claim 14 wherein the channel is located on a bottom of the step and opens downwardly, the channel extending between ends of the tube.

19. The assembly of claim 1 wherein the indentation of the center with respect to the ends produces a gap between the center and the step.

20. The assembly of claim 1 wherein contact between the clamp and the step is limited to an end edge located at each of the ends of the clamp.

21. The assembly of claim 1 wherein the at least one clamp is elongated with a central section located between end section, the central section being indented with respect to the end sections such that the end sections contact the step without the central section contacting the step.

22. The assembly of claim 1 wherein the at least one clamp is elongated with a central section located between end section, a lower surface of the central section being indented with respect to lower surfaces of the end sections such that the lower surfaces of the end sections engage the step without the central section engaging the step.

23. The assembly of claim 1 wherein the at least one clamp is elongated with a central section located between end section, a lower surface of the central section being indented with respect to lower surfaces of the end sections such that the lower surfaces of the end sections engage the step without the central section engaging the step;
- wherein contact between the clamp and the step is limited to an end edge located at each of the ends of the clamp; and
- wherein the indentation of the center with respect to the ends produces a gap between the center and the step.

\* \* \* \* \*